US011996752B2

(12) United States Patent
Inoue

(10) Patent No.: US 11,996,752 B2
(45) Date of Patent: May 28, 2024

(54) TRANSDUCER FOR PRODUCING VIBRATIONAL MOVEMENT

(71) Applicant: Groundwaves Ltd

(72) Inventor: Nicholas Inoue, Bristol (GB)

(73) Assignee: Groundwave LTD, London (GB)

( * ) Notice: Subject to any disclaimer, the term of this patent is extended or adjusted under 35 U.S.C. 154(b) by 107 days.

(21) Appl. No.: 17/780,645

(22) PCT Filed: Nov. 27, 2020

(86) PCT No.: PCT/EP2020/083776
§ 371 (c)(1),
(2) Date: May 27, 2022

(87) PCT Pub. No.: WO2021/105456
PCT Pub. Date: Jun. 3, 2021

(65) Prior Publication Data
US 2023/0117699 A1 Apr. 20, 2023

(30) Foreign Application Priority Data
Nov. 29, 2019 (GB) ...................... 1917525

(51) Int. Cl.
*H02K 33/16* (2006.01)
*B06B 1/04* (2006.01)
(Continued)

(52) U.S. Cl.
CPC ............. *H02K 33/16* (2013.01); *B06B 1/045* (2013.01); *G08B 6/00* (2013.01); *H02K 11/0141* (2020.08)

(58) Field of Classification Search
CPC ...... H02K 33/16; H02K 11/0141; G08B 6/00; B06B 1/045
See application file for complete search history.

(56) References Cited

U.S. PATENT DOCUMENTS 7,706,563 B2 4/2010 Stewart
7,859,144 B1 12/2010 Sahyoun
(Continued)

FOREIGN PATENT DOCUMENTS

GB 2549781 A 11/2017
JP 2017-5872 1/2017
(Continued)

OTHER PUBLICATIONS

Combined Search and Examination Report for GB Application No. 1917525.6, dated May 21, 2021, 6 pgs.
(Continued)

*Primary Examiner* — John A Tweel, Jr.
(74) *Attorney, Agent, or Firm* — Greg T. Sueoka

(57) ABSTRACT

This specification describes a transducer configured to convert electrical signals into vibrational movement. The transducer comprises an axially-magnetised reciprocating magnet magnetically suspended between first and second axially-magnetised stationary magnets located on opposing sides of the axially-magnetised reciprocating magnet, wherein the axially-magnetised reciprocating magnet comprises an aperture such that the reciprocating magnet has an inner boundary and an outer boundary. The transducer further comprises at least two pairs of concentrically positioned electromagnetic solenoids, the at least two pairs of concentrically positioned electromagnetic solenoids being configured to drive the reciprocating magnet to reciprocate in a volume between the first and second axially-magnetised stationary magnets. The first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the
(Continued)

reciprocating magnet at the outer boundary more than at the inner boundary.

23 Claims, 10 Drawing Sheets

(51) Int. Cl.
*G08B 6/00* (2006.01)
*H02K 11/01* (2016.01)

(56) References Cited

U.S. PATENT DOCUMENTS

| | | | | |
|---|---|---|---|---|
| 8,643,228 | B2* | 2/2014 | Vogel | G02B 23/2476 |
| | | | | 310/12.24 |
| 8,970,072 | B2* | 3/2015 | Headstrom | A61C 17/221 |
| | | | | 310/15 |
| 9,385,578 | B2* | 7/2016 | Headstrom | H02K 33/06 |
| 9,787,169 | B2 | 10/2017 | Hiemstra et al. | |
| 10,782,784 | B2* | 9/2020 | Szeto | H01H 3/503 |
| 10,804,785 | B2* | 10/2020 | Liu | H02K 33/16 |
| 10,835,924 | B1 | 11/2020 | Williamson et al. | |
| 2006/0208600 | A1 | 9/2006 | Sahyoun | |
| 2008/0001484 | A1 | 1/2008 | Fuller et al. | |
| 2014/0265644 | A1 | 9/2014 | Hiemstra et al. | |
| 2022/0093304 | A1 | 3/2022 | Kim et al. | |

FOREIGN PATENT DOCUMENTS

| | | |
|---|---|---|
| TW | 202103412 | 1/2021 |
| WO | 2008/156770 | 12/2008 |
| WO | 2020/045470 | 9/2020 |

OTHER PUBLICATIONS

International Search Report and Written Opinion for International Application No. PCT/EP2020/083776, dated Apr. 29, 2021, 16 pgs.
CNIPA Notification of First Office Action, CN Application No. 202080083147.5 Groundwaves Ltd. date Jun. 29, 2023, 11 pgs.
Combined Search and Examination Report under Sections 17 and 18(3) for GB Application No. 2107616.1, dated Mar. 4, 2022, 10 pgs.

* cited by examiner

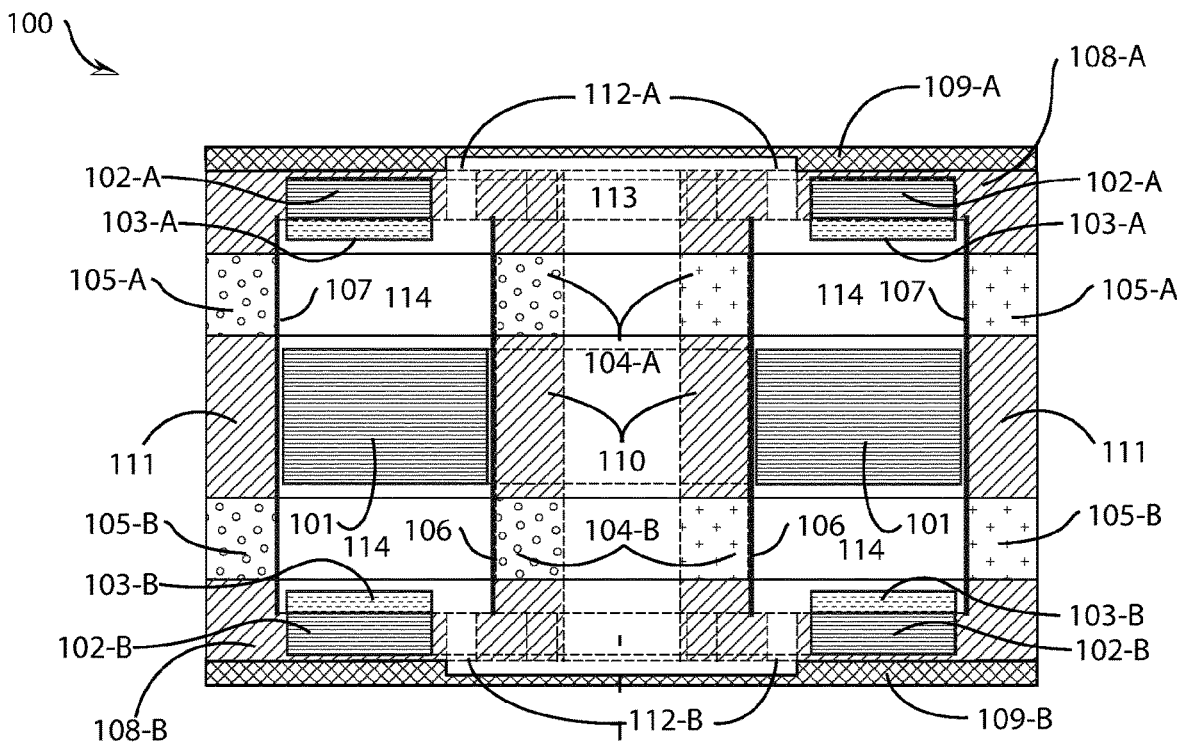
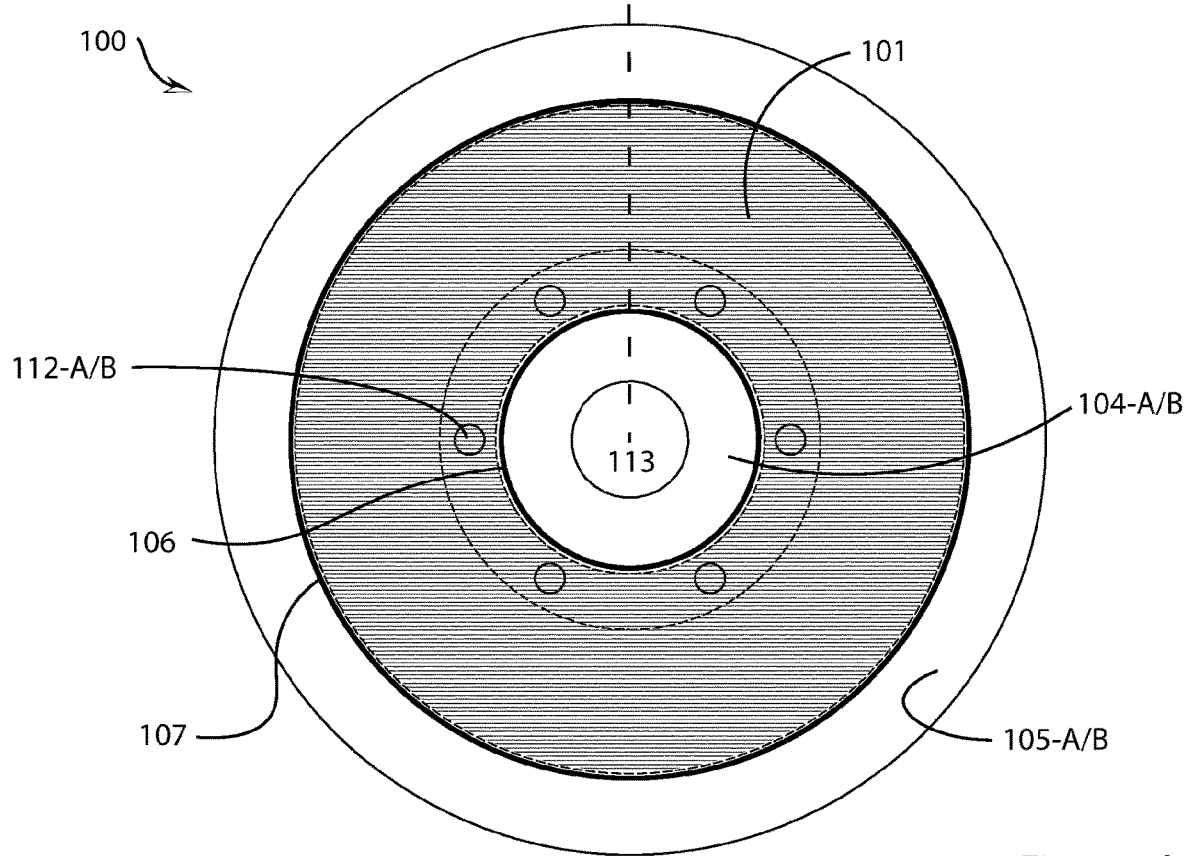
Figure 1b

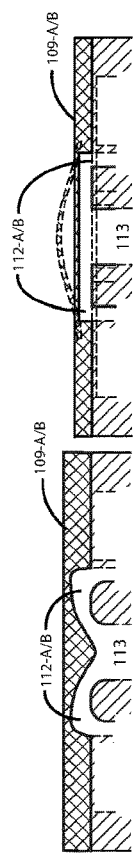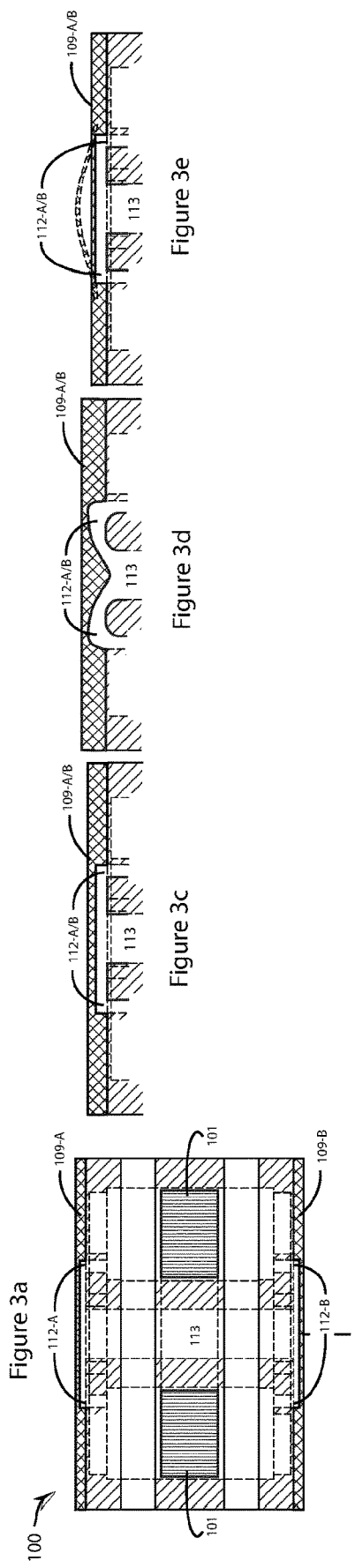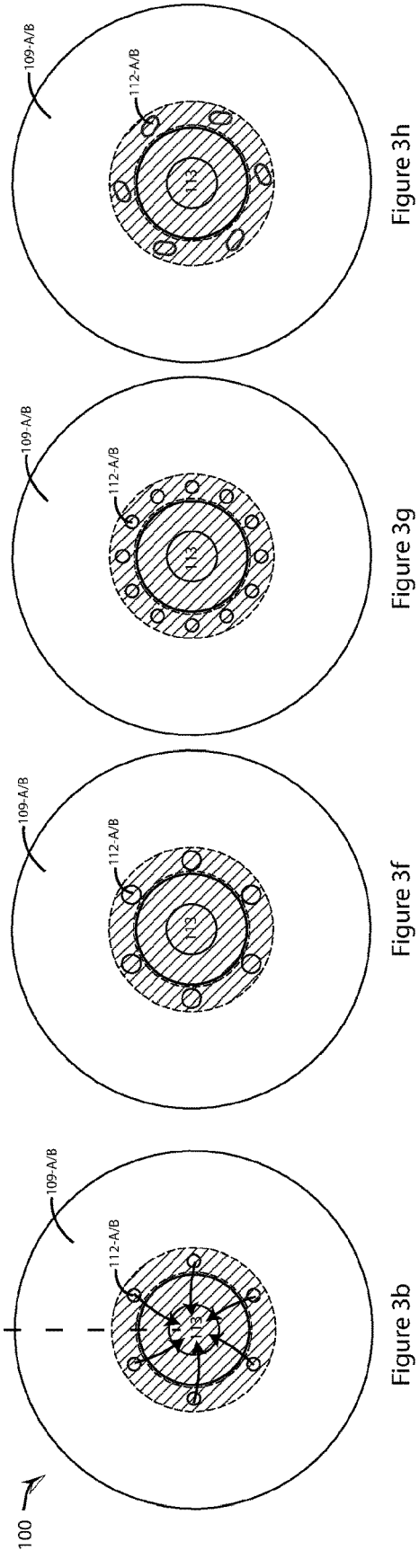

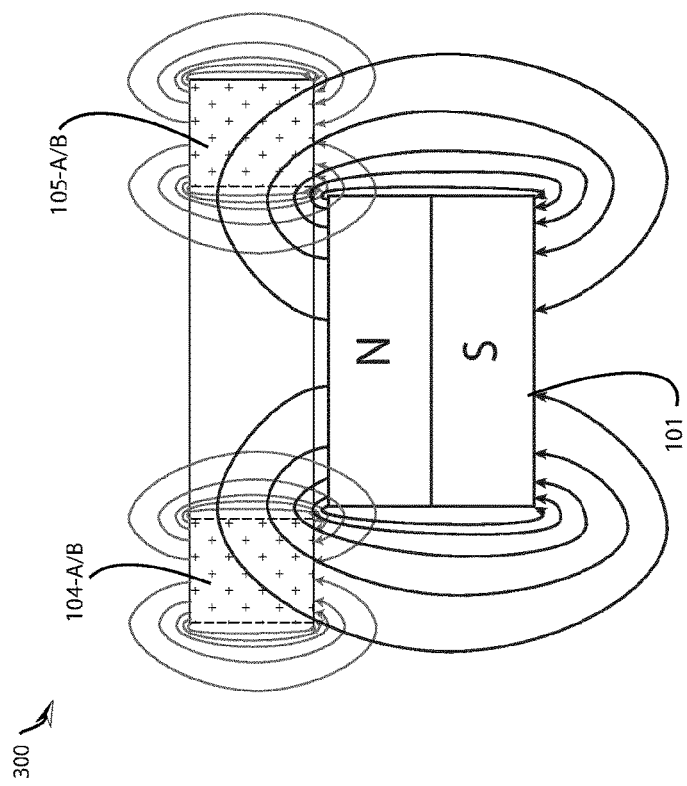
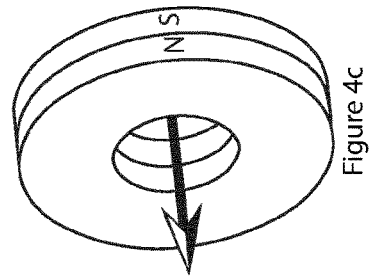
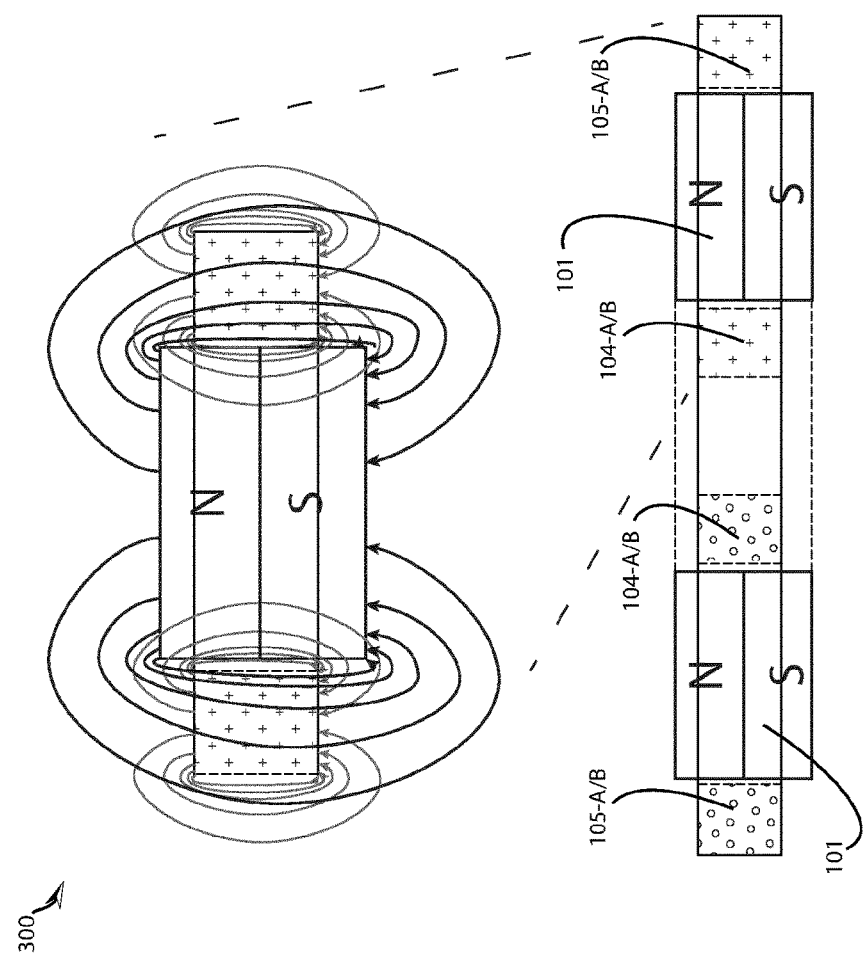
Figure 4a
Figure 4b
Figure 4c

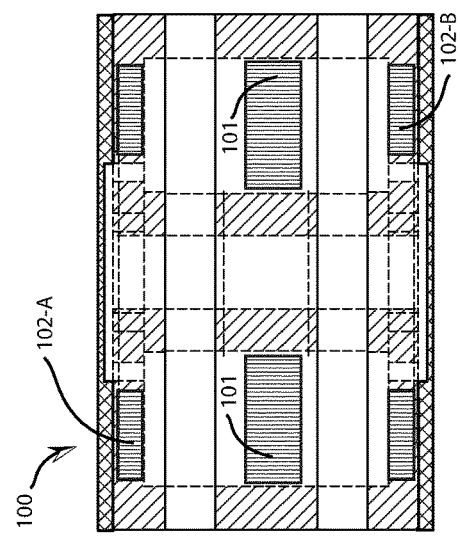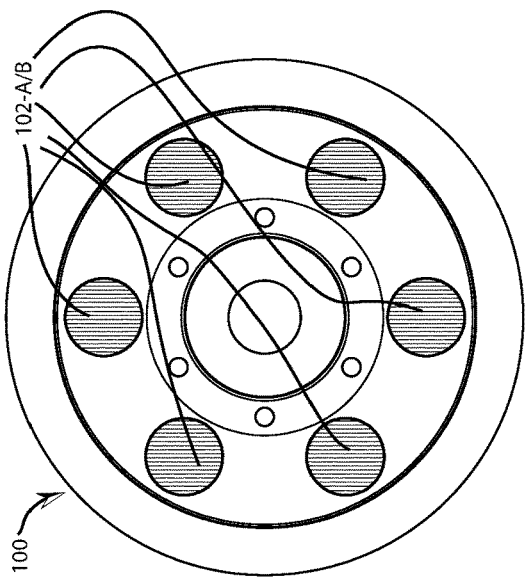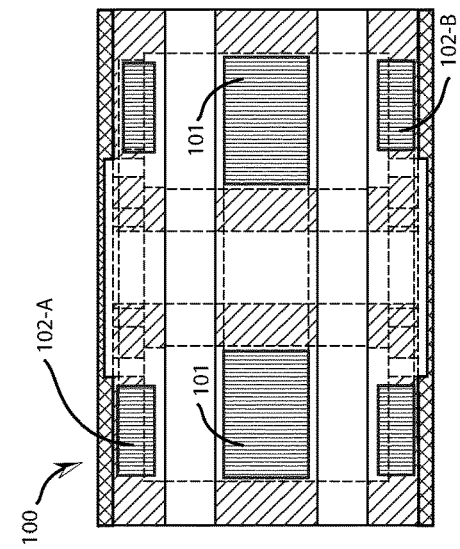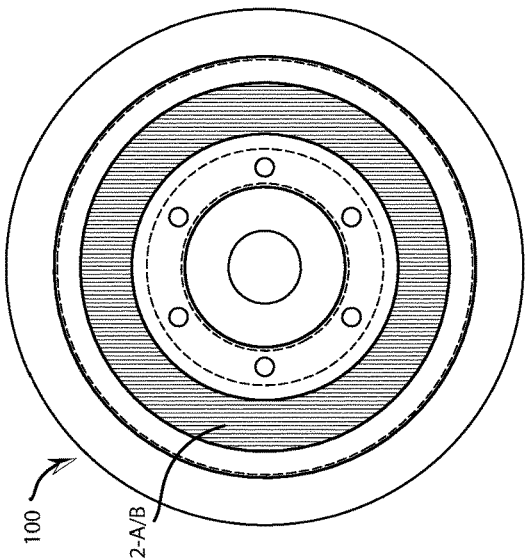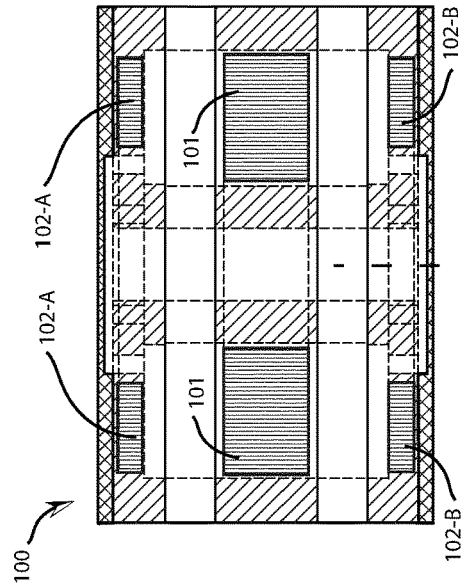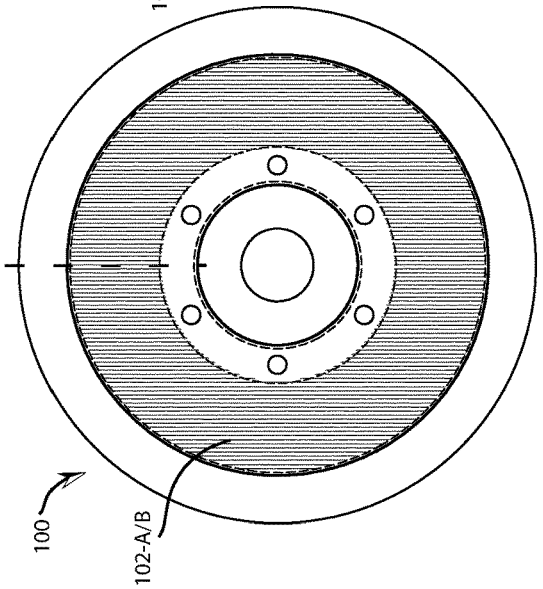

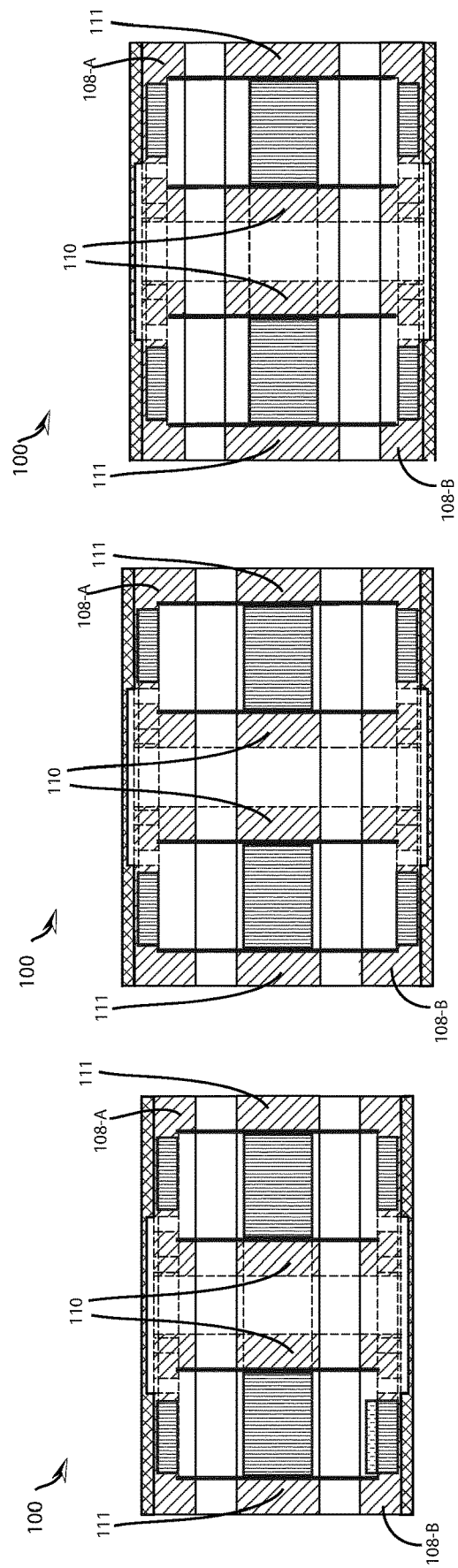

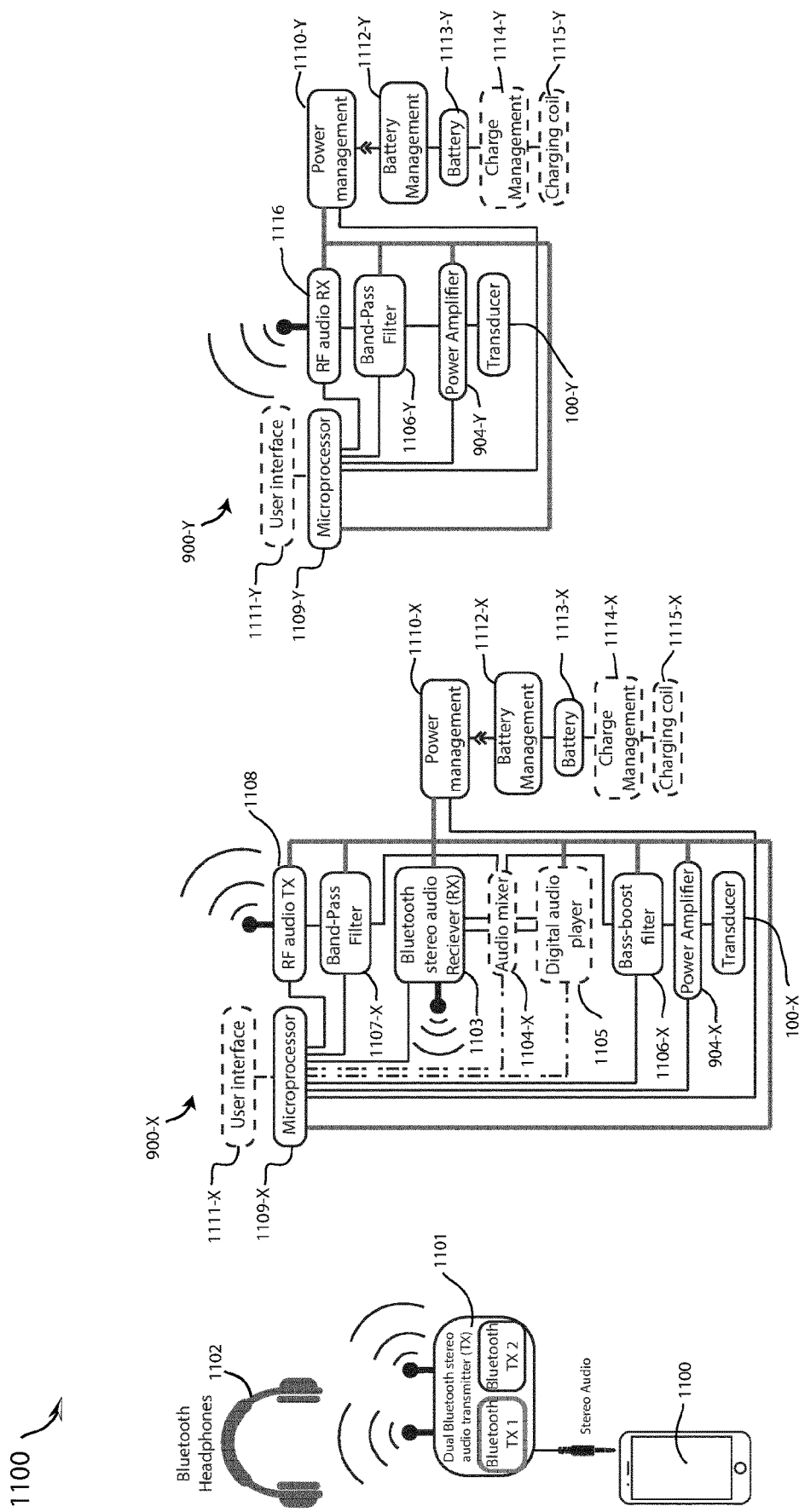

TRANSDUCER FOR PRODUCING VIBRATIONAL MOVEMENT

FIELD

This specification relates generally to a transducer for generating vibrational movement. More specifically the specification relates to a transducer that is suitable for incorporation into portable applications, such as footwear.

BACKGROUND

The use of vibration to stimulate the human sense of touch is the area of haptic technology. As an increasing number of products evolve to include haptics, there is a requirement for transducers that are compact and efficient, but which are also capable of providing a good low frequency response.

With the human foot being particularly sensitive to touch, provision of haptic-footwear (i.e. footwear that can impart vibration to the wearer's feet) is particularly desirable. However, transducers that provide a good low frequency response are not usually well-suited in terms of size or shape for use in footwear.

SUMMARY

The invention is defined by the claims.

In a first aspect, this specification describes a transducer configured to convert electrical signals into vibrational movement. The transducer comprises an axially-magnetised reciprocating magnet magnetically suspended between first and second axially-magnetised stationary magnets located on opposing sides of the axially-magnetised reciprocating magnet, wherein the axially-magnetised reciprocating magnet comprises an aperture such that the reciprocating magnet has an inner boundary and an outer boundary. The transducer further comprises at least two pairs of concentrically positioned electromagnetic solenoids, the at least two pairs of concentrically positioned electromagnetic solenoids being configured to drive the reciprocating magnet to reciprocate in a volume between the first and second axially-magnetised stationary magnets. A first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary. When viewed along the axis of reciprocation of the axially-magnetised reciprocating magnet, the first solenoid of each of the pairs of concentrically positioned electromagnetic solenoids may be located within the aperture of the reciprocating magnet, and the second solenoid of each of the pairs of concentrically positioned electromagnetic solenoids may be located outside the outer boundary of the reciprocating magnet.

The transducer may comprise a central guide member, wherein the volume in which the reciprocating ring magnet is driven to reciprocate surrounds the central guide member and the central guide member extends through the aperture of the reciprocating magnet, the at least two pairs of concentrically positioned electromagnetic solenoids being configured to drive the reciprocating magnet to reciprocate along a length of the central guide member. The transducer may further comprise an outer guide member surrounding and defining an outer boundary of the volume in which the reciprocating magnet is driven to reciprocate. The outer surface of the central guide member that is adjacent the inner boundary of the reciprocating magnet and an inner surface of the outer guide member that is adjacent the outer boundary of the reciprocating magnet may be formed of a material which reduces friction between the reciprocating magnet and the central and outer guide members. The second solenoid of each of the pairs of concentrically positioned electromagnetic solenoids may be located within, or form part of, the outer guide member. The first solenoid of each of the pairs of concentrically positioned electromagnetic solenoids may be located within, or form part of, the central guide member.

The central guide member may include a central guide member fluid channel extending through a central region of the central guide member to allow fluid to pass through the central region of the central guide member between a first end of the central guide member and a second end of the central guide member.

The transducer may further include at least one second fluid channel configured to allow fluid to pass between the volume in which the axially-magnetised reciprocating magnet is driven to reciprocate and the first end of the central guide member fluid channel. The transducer may further include at least one third fluid channel configured to allow fluid to flow between the volume in which the axially-magnetised reciprocating magnet is driven to reciprocate and a second end of the central guide member fluid channel. The transducer may be hermetically sealed.

The transducer may comprise a shock absorbing material provided between the axially-magnetised stationary magnets and the reciprocating magnet. The shock absorbing material may be provided on a surface of the axially-magnetised stationary magnets that faces the reciprocating magnet. Alternatively, the shock absorbing material may be provided on surfaces of the reciprocating magnet that face the axially-magnetised stationary magnets.

The transducer may comprise magnetic shielding to magnetically shield the environment around the transducer from the magnets of the transducer.

The reciprocating magnet may comprise: a first main surface which faces the first axially-magnetised stationary magnet; a second main surface which faces the second axially-magnetised stationary magnet; an inner surface extending between the first and second main faces at the inner boundary of the reciprocating magnet; and an outer surface extending between the first and second main faces at the outer boundary of the reciprocating magnet. In addition: an edge of the first solenoid of a first of the pairs of concentrically positioned electromagnetic solenoids may be positioned adjacent an edge of the reciprocating magnet that connects the first main surface and the inner surface; an edge of the first solenoid of a second of the pairs of concentrically positioned electromagnetic solenoids may be positioned adjacent an edge of the reciprocating magnet that connects the second main surface and the inner surface; an edge of the second solenoid of a first of the pairs of concentrically positioned electromagnetic solenoids may be positioned adjacent an edge of the reciprocating magnet that connects the first main surface and the outer surface; and an edge of the second solenoid of a second of the pairs of concentrically positioned electromagnetic solenoids may be positioned adjacent an edge of the reciprocating magnet that connects the second main surface and the outer surface.

In a second aspect, this specification describes an item of footwear comprising the transducer as described with reference to the first aspect. The item of footwear may further comprise an amplifier positioned adjacent to the transducer and configured to provide the electrical signals to the transducer. The item of footwear may further comprise a removable module which includes a battery pack and a transceiver for receiving wireless signals based on which the electric signals provided to the transducer are generated.

In a third aspect, this specification describes a tactile stimulation system comprising: a first vibration apparatus and a second vibration apparatus. The first vibration apparatus comprises: a first transducer configured to convert a first electrical signal into vibrational movement; a first wireless receiver configured to wirelessly receive a first data signal transmitted via a first communications protocol; a first wireless transmitter configured to wirelessly transmit a second data signal via a second, different communications protocol; and first processing apparatus configured to: generate, and provide to the first transducer, the first electric signal based on the wirelessly received first data signal, and generate, and provide for transmission by the first wireless transmitter, a second data signal based on the wirelessly received first data signal. The second vibration apparatus comprises: a second transducer configured to convert a second electrical signal into vibrational movement; a second wireless receiver configured to wirelessly receive the second data signal transmitted by the first wireless transmitter of the first vibration apparatus via the second communications protocol; and second processing apparatus configured to: generate, and provide to the second transducer, the second electric signal based on the wirelessly received second data signal. The first electric signal and the second electric signal cause the first and second transducers to vibrate with the substantially the same frequency response.

The tactile stimulation system may further comprise an audio player or an accessory for an audio player, wherein the audio player or the accessory for the audio player comprises: a second wireless transmitter configured to wirelessly transmit the first data signal to the first wireless receiver at the a first vibration apparatus via the first communications protocol, the first data signal being generated based on an audio data signal output by the audio player; and a third wireless transmitter configured to wirelessly transmit the second data signal to an audio speaker. The third wireless transmitter may be configured to wirelessly transmit the first data signal to the audio speaker via the first communications protocol. The first communications protocol may be a Bluetooth protocol and/or the second communications protocol may be a RF UHF communications protocol.

Each of the first and second transducers of the tactile stimulation system may be a transducer as described with respect to the first aspect. The first vibration apparatus may be provided in a first item of footwear of a pair of items of footwear and the second vibration apparatus may be provided in a second item of footwear of the pair of items of footwear.

BRIEF DESCRIPTION OF THE FIGURES

For better understanding of the apparatuses and methods described herein, reference will now be made by way of example to the accompanying drawings, whereby in which:

FIG. 1a and FIG. 1b shows two views of a transducer configured to convert electrical signals into vibrational movement;

FIGS. 3a to 3h illustrate variations in configuration of the fluid pathway that that may be provided in a transducer such as that of FIG. 1A and FIG. 1B;

FIGS. 4a-4c are illustrations of a simplified setup, depicting the magnetic motivation of the reciprocating magnet under influence from two pairs of concentrically positioned electromagnetic solenoids, and the natural resting position of the ring magnet within such an energised solenoid configuration;

FIGS. 5a to 5f depict variations in the configuration of the magnetic spring suspension system, used to suspend the reciprocating magnet, in a configuration such as that of FIG. 1A and FIG. 1B;

FIGS. 6a to 6c illustrate how the excursion distance of the reciprocating magnet in a configuration such as that of FIG. 1A and FIG. 1B, may be optimised in order to improve the transducers efficiency at converting electrical signals into vibrational movement, and to alter frequency response;

FIGS. 10a to 10c depicts an example of a system for conveying audio input from a device, wirelessly and simultaneously to a pair of shoes, each incorporating a transducer as described herein, and wireless headphones.

DETAILED DESCRIPTION

Figure 2A:
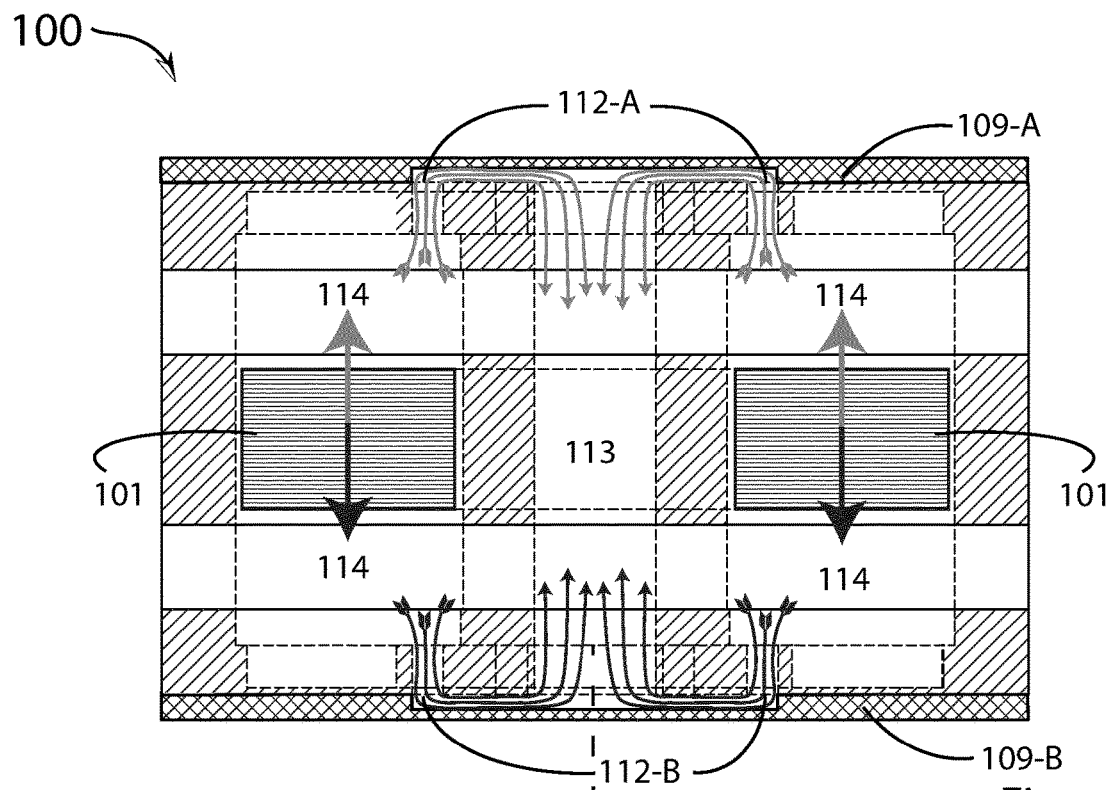
FIG. 2a and FIG. 2b shows two views of the oscillatory fluid movement within a transducer under operation, in an example configuration such as that of FIG. 1A and FIG. 1B.

In the description and drawings, like reference numerals refer to like elements throughout.

This specification relates generally to a transducer that has a good low frequency response and that is configured for integration into footwear to provide vibratory stimulation to the user based on an input audio signal (for instance, a musical composition or the audio component of AV content such as a movie or video game).

An example of such a transducer 100 is illustrated in FIG. 1a and FIG. 1b, which each show a different view of the transducer 100.

The transducer 100 comprises an axially-magnetised reciprocating magnet 101 magnetically suspended between first and second axially-magnetised stationary magnets 102-A, 102-B, located on opposing sides of the axially-magnetised reciprocating magnet 101. The pole orientation of the stationary magnets 102-A, 102-B is chosen such that they repel either side of the axially-magnetised reciprocating magnet 101, thus forming a magnetic spring assembly, whereby the reciprocating magnet rests at an equilibrium position (i.e. is suspended) between the two stationary magnets 102-A, 102-B. Since these stationary magnets are arranged so as to repel the reciprocating magnet 101 they may be referred to as repulsive magnetic spring magnets or just repulsive magnets.

The axially-magnetised reciprocating magnet 101 comprises an aperture such that the reciprocating magnet has an inner boundary and an outer boundary. A possible form for the reciprocating magnet, which has been illustrated in the accompanying drawings, is that of a ring magnet (and reciprocating magnet may sometimes be referred to as a ring magnet herein). Although there may be benefits associated with using a ring magnet, other configurations of the reciprocating magnet could instead be used. For instance, the outer boundary/perimeter of the ring magnet may be square, hexagonal or of any other shape. The inner boundary/perimeter may be of the same shape at the outer boundary or may be of a different shape. In order to ensure a shallow depth for the transducer, it may be desirable for the diameter/width of the reciprocating magnet to be greater than the depth. In some particular implementations which have been found to work well, the reciprocating ring magnet 101 has a diameter of approximately 50 mm. However, the applicability of the concepts described herein is, of course, not limited only to use with reciprocating magnet having such a diameter.

The transducer 100 further comprises at least two pairs of concentrically positioned electromagnetic solenoids 104-A, 105A and 104-B, 105-B. The two pairs may be referred to as an upper pair and a lower pair, where both solenoids of a particular pair are positioned on the same side of the reciprocating magnet 101. These solenoids are configured to drive the reciprocating magnet 101 to reciprocate in a volume between the first and second axially-magnetised stationary magnets 102-A, 102-B. More specifically, a first solenoid 104-A, 104-B of each of the pairs of concentrically positioned electromagnetic solenoids (which may be referred to as the inner solenoid of the pair) is positioned to influence the reciprocating magnet 101 at the inner boundary more than at the outer boundary, and a second solenoid 105-A, 105-B of each of the pairs of concentrically positioned electromagnetic solenoids (which may be referred to as the outer solenoid of the pair) is positioned to influence the reciprocating magnet at the outer boundary more than at the inner boundary. When viewed along the axis of reciprocation of the axially-magnetised reciprocating magnet, the first (inner) solenoid 104-A, 104-B of each of the pairs of concentrically positioned electromagnetic solenoids is located within the aperture of the reciprocating magnet 101, and the second (outer) solenoid 105-A, 105-B of each of the pairs of concentrically positioned electromagnetic solenoids is located outside the outer boundary of the reciprocating magnet 101.

In some examples, each solenoid may comprise a single coil of conducting material (e.g. wire). However, the solenoids may have any suitable form provided that they fulfil their function of driving the reciprocating magnet in the manner described herein.

The aperture provided in the reciprocating magnet provides two edges of the magnet that may be influenced by each of the pairs of the solenoids. In contrast, if the reciprocating magnet were not to have a central aperture, only one edge, the outer boundary, of the magnet could be influenced. This improves the responsiveness of the transducer and allows a heavier magnet to be used, for a given available axial length, which improves the performance of the transducer at low frequencies. It also provides for greater efficiency of the transducer such that a greater area of the reciprocating ring magnet 101 is being influenced by the solenoids.

It may be beneficial to place the inner axial surface extents of the solenoids at a close distance to the outer axial surface extents of the ring magnet 101. This enables the transducer to benefit from the regions of highest magnet flux of both the reciprocating magnet 101 and the solenoids. The concentric placement of the two solenoid pairs at a short axial distance, above and below the equilibrium position of the reciprocating ring magnet 101, provides four regions of magnetic influence upon the reciprocating magnet 101. Put another way, one solenoid pair is provided on one side of the reciprocating magnet's axis, and the second solenoid pair 105-b, 104-b is provided on the opposing side. Put yet another way, an edge of the first solenoid of a first of the pairs of concentrically positioned electromagnetic solenoids is positioned adjacent to an edge of the reciprocating magnet that connects a first main surface of the reciprocating magnet, which faces the first axially-magnetised stationary magnet, and an inner surface of the reciprocating magnet at the inner boundary of the reciprocating magnet, which extends between the first main surface and a second main surface of the reciprocating magnet which faces the second axially-magnetised stationary magnet. In addition, an edge of the first solenoid of a second of the pairs of concentrically positioned electromagnetic solenoids is positioned adjacent to an edge of the reciprocating magnet that connects the second main surface and the inner surface of the solenoid. Further, an edge of the second solenoid of the first of the pairs of concentrically positioned electromagnetic solenoids is positioned adjacent to an edge of the reciprocating magnet that connects the first main surface and the outer surface, which extends between the first and second main faces at the outer boundary of the reciprocating magnet. Also, an edge of the second solenoid of the second of the pairs of concentrically positioned electromagnetic solenoids may be positioned adjacent an edge of the reciprocating magnet that connects the second main surface and the outer surface.

The two inner solenoids 104-A, 104-B are separated by a central spacer 110 and the two outer solenoids 105-A, 105-B are separated by an outer spacer 111. The height of the central and outer spacers therefore defines the axial distance between the reciprocating magnet 101 and each of the two solenoid pairs, 105-A, 104-A and 105-B, 104-B. Selection of this axial distance is an important consideration in the design of the transducer. Whereby the longer the spacer, the further the available axial excursion for the reciprocating ring magnet 101 to accelerate and hence a greater force may be generated.

The central axial stack of the inner solenoids 104-A and 104-B, along with the central spacer 110, form a structure having an outer surface which is adjacent to inner boundary formed by the aperture of the reciprocating ring magnet 101. This stack provides a guide member (the central guide member) for the ring magnet 101. The central guide member passes through the aperture and the reciprocating magnet 101 is driven to reciprocate along its length. The central guide member also serves as a central linear bearing surface.

The outer axial stack of the outer solenoids 105-A and 105-B, along with the outer spacer 111 forms a structure having an inner surface which is adjacent to outer boundary of the reciprocating ring magnet 101. The inner surface of the outer axial stack defines an outer boundary of the volume in which the reciprocating magnet is driven to reciprocate. The outer axial stack forms an outer guide member for the ring magnet 101 and also serves as an outer linear bearing surface.

For a linear bearing to maintain free motion along a guide member, the coefficient of friction between the linear bearing and guide member must be below a certain value (X), for a given ratio between the bearing length and the lever-arm distance of the applied force (which is dependent on the diameter or width of the reciprocating magnet). This avoids stick-slip effects during dynamic motion of the reciprocating magnet, which may temporarily bind with the guide member's surface, resulting in non-linear motion.

The arrangement of transducer 100 has the benefit of two guide members serving as linear bearing surfaces. This serves to reduce the occurrence of the slip-stick effect. This is because it increases the critical value (X) below which free motion is maintained and above which stick-slip can occur. This provides the opportunity to employ a longer lever-arm for a given bearing length.

For the application of a transducer 100 described herein, utilising an inner and outer guide member allows for the axial length (i.e. the depth) of the reciprocating ring magnet 101, i.e. the bearing length, of the reciprocating ring magnet 101 to be shorter than were the apparatus to use only a single guide member, whilst avoiding stick-slip binding of the reciprocating member on such guides. Such reduction in axial length lends to a reduction in the overall profile of the transducer.

As mentioned above, in order to avoid stick-slip, it is beneficial to reduce the coefficient of friction between the dynamic and static parts. As such, as illustrated in, FIGS. 1A and 1B, the transducer 100 may include elements 106 and 107 which are static surfaces adjacent and affixed to the outside of the central axial stack, and the inner surface of the outer axial stack The static surfaces 106 and 107 may form part of the central and outer guide members respectively. Specifically, static surface 106 is adjacent to the inner boundary of the reciprocating magnet 101 and static surface 107 is adjacent to the outer boundary of the reciprocating magnet 101.

The static surfaces 106 and 107 may be formed, coated or have layered on, a material which reduces friction between the reciprocating magnet 101 and the central and outer guide members. One material which has proven to work effectively is to use sleeves of epoxy impregnated cardboard with a graphite coating.

In addition or alternatively, the reciprocating ring magnet 101 may also be coated with, or have layered onto it, low friction materials. Furthermore the reciprocating ring magnet 101 may be assembled into, or be cast as, a sabot, which may be formed from, or be coated with, a low friction material. The low friction layer or coating should be of adequate thickness to maintain low friction over a long period despite abrasion occurring due to reciprocation of the magnet.

Whether it is the guide members which feature low-friction surface layers and/or the reciprocating ring magnet 101, the gap between the reciprocating ring magnet's magnetic surface, and the solenoids' magnetic surface should, ideally, be minimal so as to increase the transducer's electromechanical efficiency.

Where such transducer 100 is to be mass produced, the entire frame assembly, including the solenoids but without the elements 108-A 109-A, may be formed in a single operation. Plastics that have inherent resilience to temperature changes whilst providing a long term abrasion resistant low friction surface may be used. An example of a good material may be PEEK or a PEEK and PTFE composite.

The gap between the reciprocating ring magnet 101 and the central guide member's low friction surface should be minimised for two reasons. Firstly a minimal gap reduces the amount of axial misalignment allowable. This serves to ameliorate undesirable mechanical resonance modes of the ring magnet 101 during dynamic movement (whilst, of course, allowing a gap large enough to provide free motion of the ring magnet 101). The second aspect to consider in relation to the gap relates to the working fluid that surrounds the reciprocating ring magnet 101 and forms a volume 114 in between the central and outer guide member and within which the ring magnet 101 reciprocates. The gap should be chosen such that the fluid surrounding ring magnet 101 is directly influenced upon movement of the ring magnet 101 but such that there is no significant flow of fluid between the central guide member and the inner surface of the aperture of reciprocating ring magnet 101 and between the outer surface of the ring magnet 101 and the inner surface of the outer guide member. If concentric tolerances in the order of 10's of microns are obtained between the static and dynamic surfaces, and if the dynamic viscosity of the fluid is low, a gap may be chosen such that the reciprocating ring magnet 101 rides smoothly on the guide members with a thin film of the fluid which surrounds it, providing self-lubrication, as with an air bearing when the fluid is a gas.

The central guide member, and outer guide member are held in concentric formation by connecting surfaces 108-A and 108-B that span between the inner guide member and the outer guide member at either end of the guide members. These may be referred to as upper and lower (or first and second) connecting surfaces 108-A and 108-B.

Aside from providing a connecting surface between the inner and outer guide member, the connecting surface may hermetically seal the volume 114 in which the reciprocating ring magnet 101 is to move. The fluid within the volume 114 may serve to resist or dampen the reciprocating movement of the magnet. This may have some benefits such as dampening external shocks. Further in some implementations, the fluid (e.g. a gas composition) may be chosen (or omitted altogether, e.g. as in a vacuum) so as to produce a particular level of damping (which depends on the compressibility) and/or to provide a particular frequency response for the transducer.

However, the main application for the transducer is to generate reactive force from a moving mass. Therefore allowing a maximum peak-peak amplitude displacement of the reciprocating magnet 101 is generally desirable. As such, it may be desirable to have as little restriction to the movement of the reciprocating magnet as possible to improve overall electromechanical efficiency of the transducer 100. Therefore connecting surfaces 108-A and 108-B may have an orifice or a number of orifices 112-A and 112-B, that allows fluid to flow in-and-out of the volume that is created in between the central guide member and outer guide member, under influence from the motion of reciprocating ring magnet 101. However for the use of a tactile transducer that works on the effect of the reaction force generated by a moving mass, such flow may be used in a more suitable manner. In particular, the central guide member may include an aperture 113 that extends axially throughout the central guide member 104-B, 110, 104-A and connects at either end to the volume 114 via the one or more orifices 112-A, 112-B. For instance, the solenoids 104-A and 104-B may be wound or otherwise configured so that they have a central aperture 113, which may be referred to as a central guide member fluid channel 113. This fluid channel 113 in the central guide member enables the fluid which is directly influenced by the movement of the reciprocating ring-magnet 101 to be redirected in a beneficial manner.

Figure 2B:
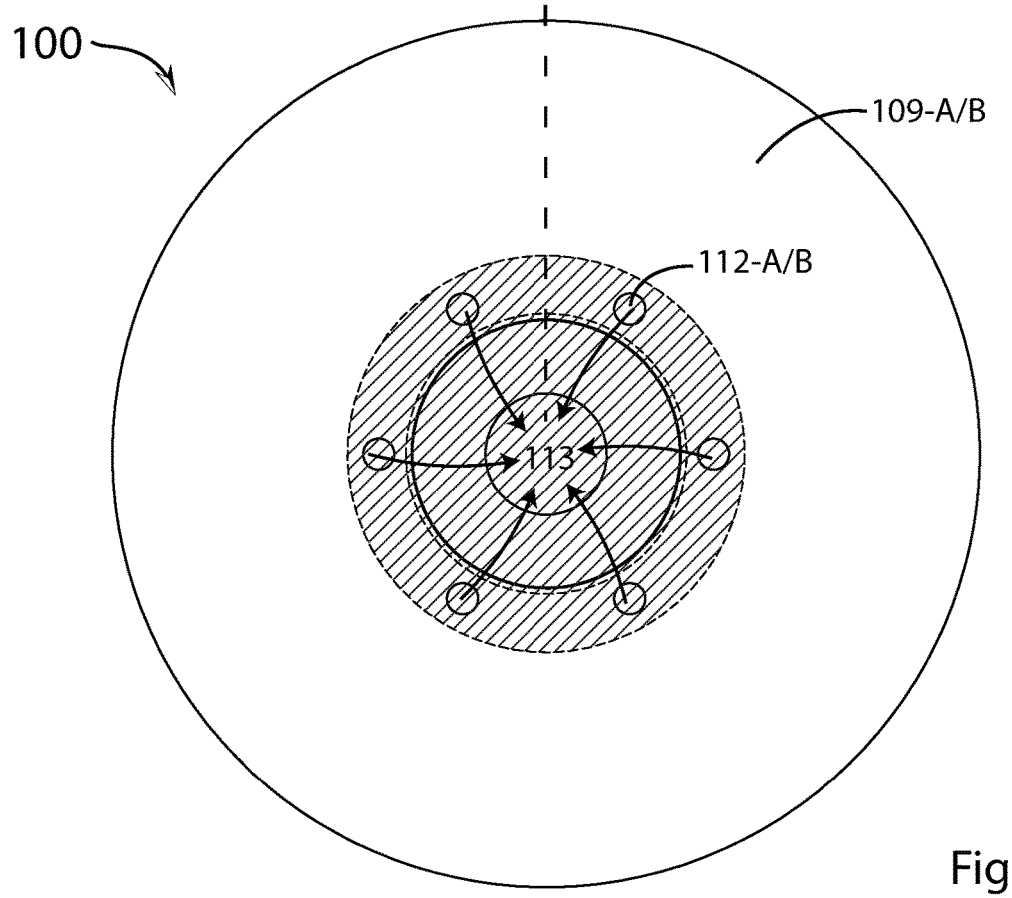

Specifically, as is illustrated in FIGS. 2a and 2b, the fluid can be urged by the movement of the reciprocating magnet 101 out of the volume on a first side of the magnet 101 (i.e. the side towards which the magnet 101 is moving) through a second fluid channel (of which the orifice(s) e.g. 112-A in one of the connecting surfaces e.g. 108-A are part) and into the central guide member fluid channel 113. From the central guide member fluid channel 113, the fluid flows through a third fluid channel (of which the orifice(s) e.g. 112-B in the other one of the connecting surfaces e.g. 108-B are part) into the portion of the volume 114 on the other side of the ring magnet 101. In this way, compressive loss/damping can be avoided. The first and second fluid channels that connect the volume to 114 to the central guide member fluid channel 113 may be completed with a simple disc featuring a recess which is sealed to the outer axial surface of element 108-A and 108-B, illustrated in transducer 100 by element 109-A and 109-B.

Another benefit arising from this arrangement of fluid channels is that the heat generated in the solenoids in the central guide member 104-A and 104-B, may be effectively transferred to the fluid present within the transducer 100, by the oscillating movement of fluid that results from the movement of reciprocating ring magnet 101. An increase in power delivered to the solenoids results in increased resistive heating, but is accompanied by a faster flow transfer rate of coolant through the central member aperture 113. This approach to dissipating heat may be preferable to other approaches since the use of certain thermally conducting materials (e.g. aluminium or copper) within the transducer may result in eddy currents which would potentially be problematic to performance of the transducer.

The fluid within the transducer may be a liquid or gas. If a liquid were to be used, such liquids that have magnetic micro-particle constituency may enable the frequency response of the transducer 100 to be modified by an external magnetic field. However, where minimal restriction of the reciprocation of ring magnet 101 is desirable, a gas may be preferable. The gas may be air or dry nitrogen, or may be a gas which is particularly effective at thermal transfer, such as helium or hydrogen.

When the heat from the inner solenoids is transferred to the fluid contained within the transducer 100, it is then transferred to the reciprocating ring-magnet 101 and also to the outer solenoids 105-A and 105-B, which results in the transducer being heated more evenly across the device. The thermal heat may then be managed by extracting it from the outer member solenoids 105-A and 105-B by using a thermal pathway which may be a thermally conductive band which may be a metal such as copper or aluminium, or may be a heat-pipe assembly, either of which will lead to a heat-sink external to the transducer 100.

Aggressive motion of the reciprocating magnet 101 may result in the reciprocating magnet impacting with the repulsive stationary magnets 102-A and 102-B with enough force to damage either the reciprocating magnet 101 or the stationary magnets 102-A and 102-B. As such, the transducer may further include a material which can absorb shock and stop direct impact between the reciprocating and stationary magnet surfaces. Such a material may be a rubber. For instance, Sorbothane rubber exhibits useful characteristics, such that the dampening of shock from an impact is effective at reducing bounce, resulting in less audible sound generated from the impact.

Such shock absorbing material may be located either on the dynamic reciprocating magnet 101 and may form part of its construction in a low-friction sabot, or may be located on the surfaces of the stationary magnets that face the reciprocating ring magnet 101 which is what is described in transducer 100 as element 103-A and 103-B.

FIGS. 3a to 3h illustrates example variations in the configuration of the fluid channels which may be incorporated into the transducer. FIG. 3a and FIG. 3b show a "baseline" configuration for the fluid channels which is consistent with that illustrated and described with reference to FIGS. 1a, 1b, 2a and 2b.

FIG. 3c illustrates a variation from the baseline depicted in FIG. 3a and FIG. 3b, by increasing the depth of recess formed in element 109-A and 109-B. By increasing the depth, the resistance for the fluid to flow is decreased and thereby by extension, also decreases the resistance to the movement of reciprocating ring magnet 101.

FIG. 3d depicts a configuration in which the second and third fluid channels are of a more complex shape. In particular, the first and second fluid channels may be configured so as to be without sharp edges so as to promote equal resistance to flow no matter the direction. This is desirable for both efficient mechanical operation of the transducer 100, but also to avoid turbulent flow which may lead to an undesirable "chuffing" noise and loss in electromechanical efficiency.

FIG. 3e illustrates element 109-A and 109-B with a recess that is deep enough compared with the thickness of the disc 109, such that the remaining material is flexible under the pressure changes that occur during operation of transducer 100. FIG. 3c shows both the natural and expanded positions of the flexible region of the disc. Such an effect may supplement the tactile stimulation if the expanding area of element 109-A and 109-B were to be close or in contact with the skin of the user.

FIG. 3f, FIG. 3g and FIG. 3h, illustrate various possible configurations of the orifices 112-A and 112-B that form part of the first and second fluid channels. More specifically, FIG. 3f shows an enlarged diameter as compared to the baseline, FIG. 3g shows a larger number of orifices and FIG. 3h shows a modified shape as compared to the baseline. Such configurations may serve to reduce resistance of the fluid pathway (FIG. 3f), to promote laminar flow out from orifices 112-A and 112-B to reduce chuffing-noise (FIG. 3g) and to redirect the flow efficiently by 180 degrees, into the central member aperture 113 (FIG. 3h).

FIG. 4a and FIG. 4b illustrate a simplified representation 300 of the magnetic field interaction in the transducer 100, between the solenoids 104A/105A or 104B/105B and the reciprocating magnet 101 which is magnetised axially, as depicted in FIG. 4c.

FIG. 4A illustrates a natural magnetic equilibrium position of the reciprocating magnet 101 within a pair of energised solenoids (the inner solenoid 104-A/B being located within the aperture of the reciprocating magnet 101 and the outer solenoid 105 A/B being located around the outer boundary of the reciprocating magnet 101) in a situation wherein there is no external repulsive force onto the reciprocating magnet 101 in the form of a magnetic spring as described in transducer apparatus 100. The length of axial excursion of the reciprocating magnet 101 outside the axial extents of the solenoids 104 A/B and 105 A/B is selected based in part on the natural magnetic equilibrium position of the reciprocating magnet 101 within a pair of energised solenoids.

FIG. 4a also includes an enlarged view of one half of the arrangement 300 depicting the magnetic field lines of the reciprocating magnet 101 and the central solenoid 104A/B and outer solenoid 105A/B. Such depiction serves to illustrate how the central solenoid 104A/B, influences the reciprocating magnet at its inner boundary/edges more than at the outer boundary/edges of the reciprocating magnet 101. Likewise, it illustrates how the outer solenoid 105A/B influences the reciprocating magnet at its outer boundary/edges more than at the inner boundary/edges of the reciprocating magnet 101. By influencing both the reciprocating magnet 101 at both the inner and outer boundaries/edges, the magnetic influence from the static solenoids 104A/B and 105A/B onto the reciprocating magnet 101 is increased when compared to if only the inner or outer edge were to be magnetically influenced by a comparable solenoid. The effect is to increase the electromechanical efficiency of the transducer.

FIG. 4b illustrates a similar enlarged view as provided in FIG. 4a, except in this instance, the reciprocated magnet is being magnetically held in position (suspended) by the stationary magnets 102-A and 102-B (not shown). The position in which the reciprocating magnet 101 is held is a distance beyond the axial surface extent of the solenoid 104A/B and 105A/B. This distance beyond the axial surface extent of the solenoid is dictated by the length of the central axial spacer 110 and outer spacer 111. The flux lines depicted in FIG. 4b aid in understanding the magnetic interaction that occurs between the reciprocating magnet 101 and the solenoids 104A/B and 105A/B in the instantaneous time that the solenoids are energised. The extent to which force onto reciprocating ring magnet 101 is influenced by the solenoids 104A/B and 105A/B depends on the number of distorted magnetic flux lines between the static solenoids and the reciprocating magnet. If one were to choose an increased length of central axial spacer 110 and outer spacer 111 (i.e. increasing the separation between the upper and lower pairs of solenoids), the reciprocating ring magnet 101 would have further free axial excursion distance, providing greater distance to allow for higher acceleration and force generation. However, a consequence of this is also that the position at which the reciprocating magnet is held by the stationary magnets 102-A, 102-B is further from the influence of the solenoids 104A/B and 105A/B and so is thereby less electromechanically efficient. It is therefore beneficial to select an axial distance which has been optimised to produce the greatest magnetic influence from the solenoids A/B and 105A/B onto reciprocating ring magnet 101 as well as the axial displacement, whilst keeping in mind the overall depth of the transducer apparatus 100 in the application of wearable technology.

FIGS. 5a to 5f are different views of a various configuration which may be employed for the stationary magnets 102a and 102-B of the repulsive magnetic spring assembly that suspends reciprocating magnet 101. FIGS. 5a and 5b depict one example configuration for the stationary magnets. As illustrated, in FIG. 5b (and also FIG. 5d) the stationary magnets may be ring magnets.

As illustrated in FIGS. 5c to 5f the configuration of the stationary magnets may be modified/selected based on the desired magnetic spring stiffness, whilst maintaining a uniform force across the axial surface extents of the reciprocating magnet (i.e. the main surfaces of the reciprocating magnet connecting the outer boundary to the inner boundary). Unequal force from the repulsive magnets 102-A and 102-B across the axial surface extents of the reciprocating magnet 101 may result in unequal wear of the inner and outer guide members or unwanted mode vibrations of reciprocating magnet 101.

As such the repulsive stationary magnets 102-A and 102-B should be chosen such that their shape provides equal force onto the reciprocating ring magnet 101. It may therefore be desirable for the stationary magnets 102-A and 102-B to have a similar shape to the reciprocating magnet. As such, where the reciprocating magnet is a ring magnet, the stationary magnets may also be ring magnets of similar axial surface area and shape to that of the reciprocating ring magnet 101.

When compared to the configuration of FIGS. 5a and 5b, FIG. 5c depicts an increase in the axial depth of stationary magnets 102-A and 102-B, whereas FIG. 5e has a reduced axial depth of ring magnet. As the axial depth of a permanent magnet, for a given material, is related to the surface magnetic field flux, increasing the axial depth of any magnet within the magnetic spring will result in a higher spring stiffness, and vice-versa for a reduction in thickness of magnets. The magnetic spring stiffness and mass of magnet should be chosen such that it has a natural resonance at the desired operating frequency of the transducer 100.

As illustrated in FIG. 5d, the stationary magnets 102-A and 102-B may only partially cover the area of that of the reciprocating ring magnet 101, such as to reduce the magnetic spring stiffness whilst maintaining equal force upon the axial surface extents of ring magnet 101.

As illustrated in FIG. 5f, each of the stationary magnets 102-A and 102-B may be formed of a plurality of magnets. These are equally spaced from one another and are provided in an arrangement which is dependent on the shape of the main surfaces of the reciprocating magnet (so in this example they are arranged in a ring). The use of a plurality of small magnets (e.g. small disc magnets), instead of a single magnet may allow for a wider range of magnetic stiffness to be obtained due to the higher number of arrangements possible. Such arrangement of small magnets may be so that there is a gradient of force radially across the span of the axis between the central guide member and the outer guide member. Such an arrangement may be used to reduce the possibility of stick-slip effects by having a higher spring force centrally onto the reciprocating ring magnet 101 than the outer span.

FIGS. 6a to 6c illustrate various examples of the spacing between the solenoid pairs 104-A/105-A and 104-B/105-B, and the excursion length beyond their outer axial surface. The central spacing between the solenoids is dependent on the length of the central spacer 110 and outer spacer 111. As mentioned previously, the length chosen is a trade-off between the potential magnetic-coupling and the available excursion distance of the reciprocating magnet 101. This is because if the length of the spacer is equal to that of the axial length (also referred to as the depth) of the reciprocating magnet 101 so that both the outer axial surface extents of the reciprocating magnet 101 are aligned with the inner axial surface extents of the solenoid pairs 104-A/105-A and 104-B/105-B, the available force that the solenoid has upon the reciprocating magnet reaches its maximum. However, the available excursion distance of the ring magnet 101, before it reaches preferred equilibrium as illustrated in FIG. 4a, is short and therefore the maximum available acceleration is limited. The influence that a solenoid has upon a magnet decreases by the inverse cube for a given distance. Therefore, a spacer 110, 111 that is longer than the axial length of ring magnet 101, as in FIG. 6c, may result in less force generated to the reciprocating magnet 101 under electromagnetic influence of the solenoids, resulting in a less efficient transducer.

The arrangement of FIG. 6a has a spacer 110, 111 which is approximately 20% longer than the axial length of reciprocating ring magnet 101 and has found to be an effective compromise between available excursion length of ring magnet 101, and electromagnetic coupling between solenoid pairs 104-A/105-A and 104-B/105-B, and magnet 101. As will be appreciated, other spacer lengths could instead be used. For instance, the spacing between the upper and lower solenoids could be between 10% and 30% longer than the depth of the reciprocating magnet, or between 15% and 25% longer than the depth of the reciprocating magnet, or between 17.5% and 22.5% longer than the depth of the reciprocating magnet.

FIG. 6b shows an increase in external excursion distance within element 108-A and 108-B, (i.e. the length of the volume in which the magnet can reciprocate that is above and below the solenoids) as compared with that of the configuration shown in FIG. 6a. With such a configuration, there is a trade-off between overall transducer axial length (i.e. how thick/deep it is), and available excursion of the ring magnet 101. An increase in excursion length beyond the outer axial length of the solenoid pairs 104-A/105-A and 104-B/105-B, allows for a deeper impact mitigation strategy, such as foam material, to be in between the reciprocating magnet 101 and the stationary magnets 102-A and 102-B. Also, deeper spring magnets 102-A and 102-B may be used.

Figure 7:
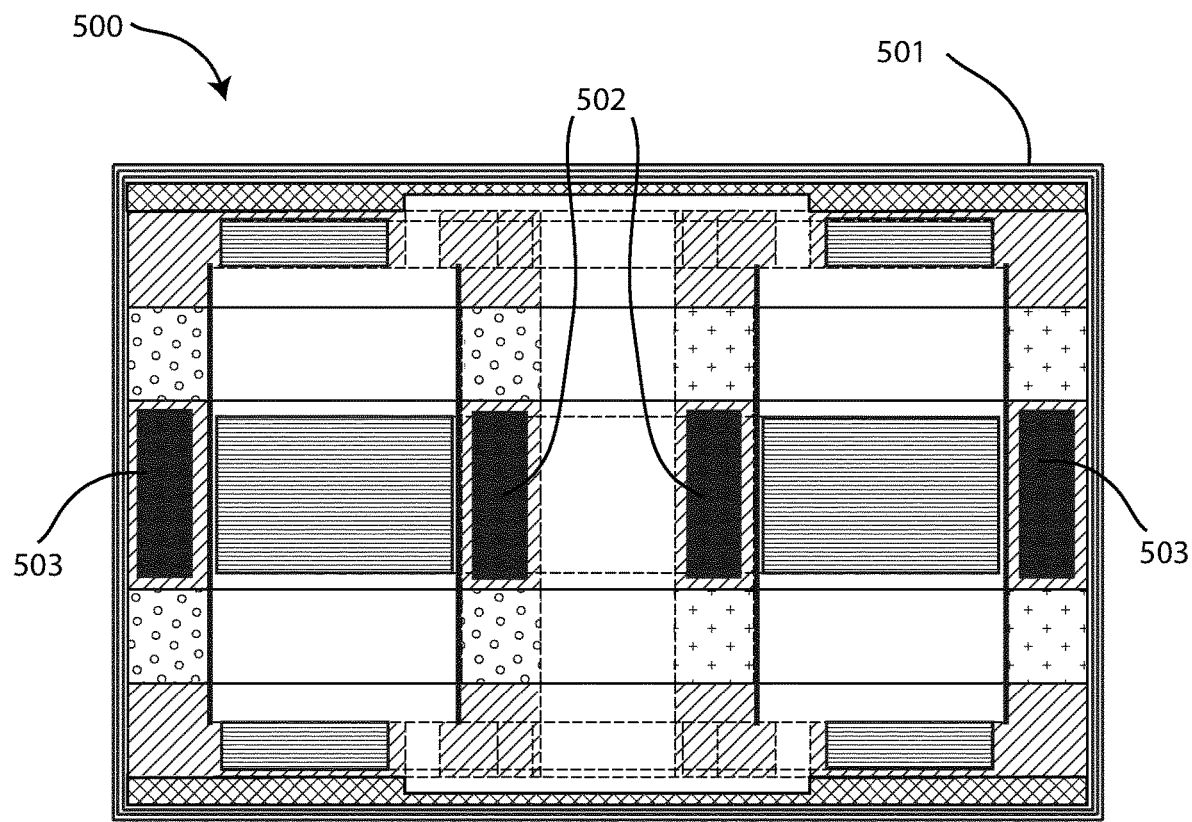
FIG. 7 is an illustration of an example approach for magnetically shielding the transducer in a configuration such as that of FIG. 1A and FIG. 1B.

FIG. 7 illustrates that the transducer 100, which is comprised of high strength permanent magnets and solenoids which may not have an internal magnetic return path, may have a high stray magnetic field. As such, the transducer may include magnetic shielding to manage such stray magnetic fields.

External magnetic shielding of the transducer apparatus 100 may be provided through the use of an external magnetic yolk. Such yolk may be comprised of mild steel or laminations of single-grain high-silicon steel oriented in a way as to make a complete magnetic path for the stray field. Another possible material is Mu-Metal, which is a nickel-iron alloy that exhibits a high magnetic permeability.

In order to minimise eddy-current loss in the magnetic shielding, instead of using a single layer of a thickness adequate to shield the stray magnetic field from transducer apparatus 100, it may be preferable to use several layers of Mu-Metal foil, with each internal layer being electrically insulated from the next outer layer. This is illustrated by element 501 which encases the transducer.

In addition or alternatively, the transducer may include elements 502 and 503, which are rings of non-ferromagnetic but electrically conductive material (e.g. aluminium or copper) embedded within the inner spacer 110 and outer spacer 111. These elements may serve to actively generate eddy currents, under the inductive influence of the reciprocation of ring magnet 101, and thereby modify the overall frequency response of the transducer apparatus 100. Such frequency modification is to have a passive effect of a low pass filter, such configuration may also inhibit damage from external shock upon the transducer by limiting the amount of acceleration possible of reciprocating ring magnet 101.

Figure 8A:
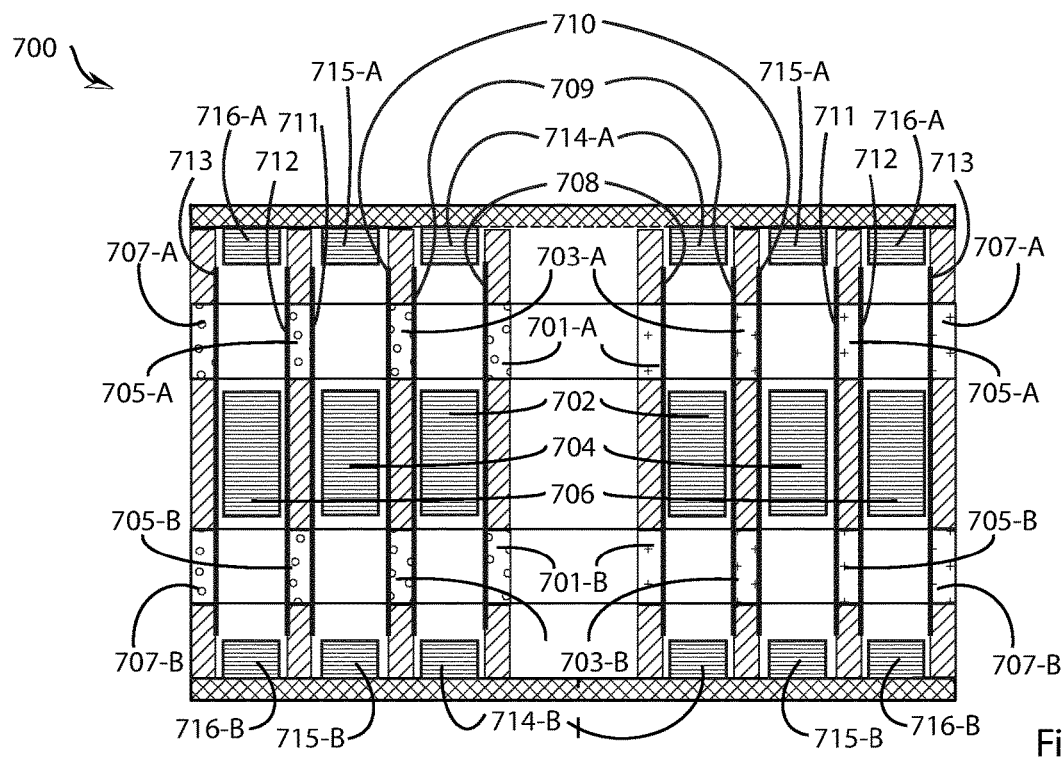
FIGS. 8a and 8b illustrate an example of a plurality of concentrically placed reciprocating magnets may be provided in a transducer in accordance with the concepts described herein in order to provide a transducer having boarder frequency response.
Figure 8B:
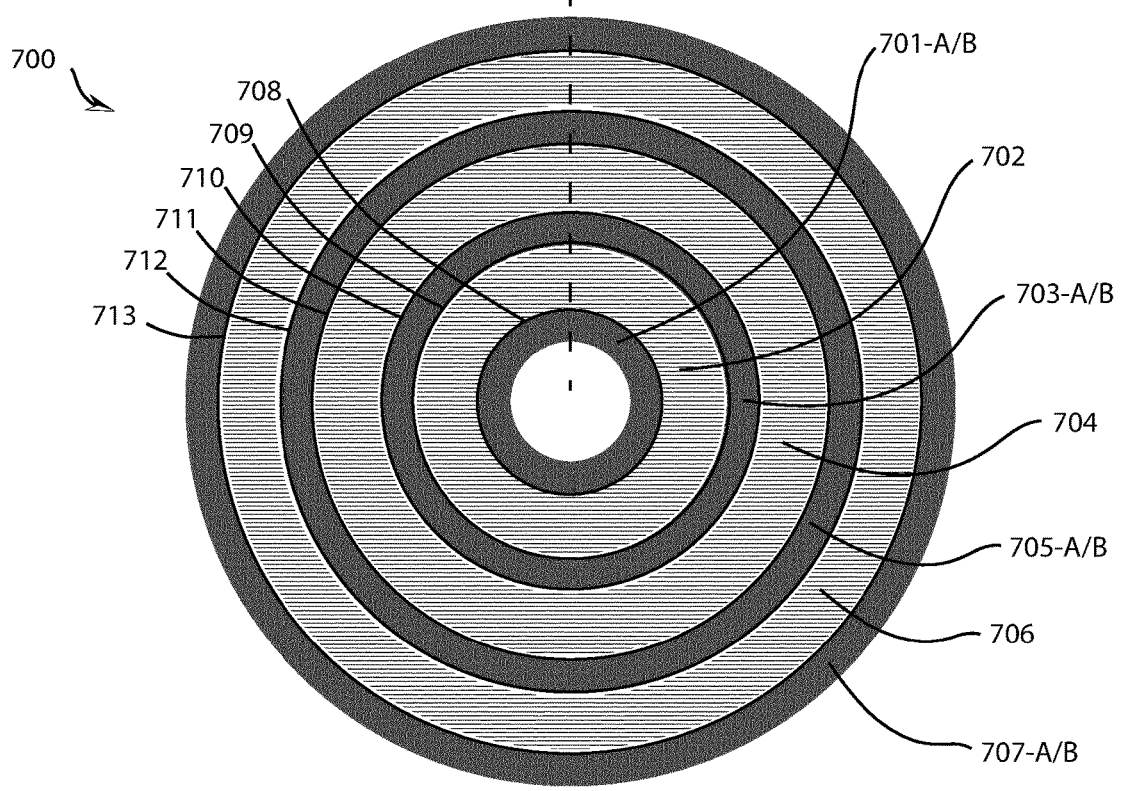

FIGS. 8a and 8b illustrate two views of an example transducer 700 which is a modification of the transducer 100 illustrated in the previous Figures that includes a single reciprocating magnet 101.

In the example of FIGS. 8a and 8b, the transducer includes a plurality of reciprocating (e.g. ring) magnets elements 702 704 and 706, which are placed concentrically within each other. In such a configuration, the magnets with a larger diameter have an increased mass as compared to the magnets of a smaller diameter. An advantage of using a plurality of reciprocating ring magnets of different mass, is that each reciprocating ring magnet which is suspended within its own magnetic spring, will have its own resonant frequency and bandwidth. Thus, the operating bandwidth of the whole transducer 700 may be broadened.

As with the transducer 100 of the earlier Figures, the reciprocating magnet 101 which reciprocates on an inner and outer guide members, each reciprocating magnet in apparatus 700 also has a guide member at both the inner and outer boundaries of the reciprocating magnet. For the inner reciprocating magnet 702, the inner boundary slides upon a low friction surface 708 which surrounds the inner first guide member and the outer boundary of 702 slides on the surface 709 which surrounds second guide member. The magnetic spring is formed by the placement of stationary repulsive magnets above and below the axial extents of the inner reciprocating magnet 702 shown as elements 714-A and 714-B.

Such arrangement is similar for the middle reciprocating magnet 704 which has an internal boundary guided by surface 710 which is upon the third guide member and the outer boundary of 704, guided by 711 which is upon the fourth guide member. The magnetic spring for 704 is formed by stationary magnets 715-A and 715-B.

The outer reciprocating magnet 706, has an inner boundary which slides upon a low friction surface 712 which surrounds the fifth guide member and the outer boundary of 706 slides on the surface 713 which is on the inner surface of the sixth guide member. The magnetic spring is formed by the placement of stationary magnets above and below the axial extents of the outer reciprocating ring magnet 706 shown as elements 716-A and 716-B.

For each reciprocating magnet in transducer 700, as with transducer 100, each reciprocating magnet may be influenced to move by the magnetic field of solenoids which influence both above and below the axial extents of the inner edge of the central aperture of the reciprocating magnet, and the axial extents of the outer edge of the reciprocating magnet. For the inner reciprocating magnet 702, the inner edge is influenced by the axial stack of elements 701-A and 701-B held between a spacer, and forming the first guide member. The outer edge of the magnet 702 is influenced by the axial stack of elements 703-A and 703-B held between a spacer, and forming the second guide member.

For the middle reciprocating magnet 704, the inner edge is influenced by the axial stack of elements 703-A and 703-B held between a spacer, and forming the third guide member. The outer edge of the ring magnet 704 is influenced by the axial stack of elements 705-A and 705-B held between a spacer, and forms the fourth guide member.

For the outer reciprocating magnet 706, the inner edge is influenced by the axial stack of elements 705-A and 705-B held between a spacer, and forming the fifth guide member. The outer edge of the reciprocating magnet 706 is influenced by the axial stack of elements 707-A and 707-B held between a spacer, and forms the sixth guide member.

Figure 9:
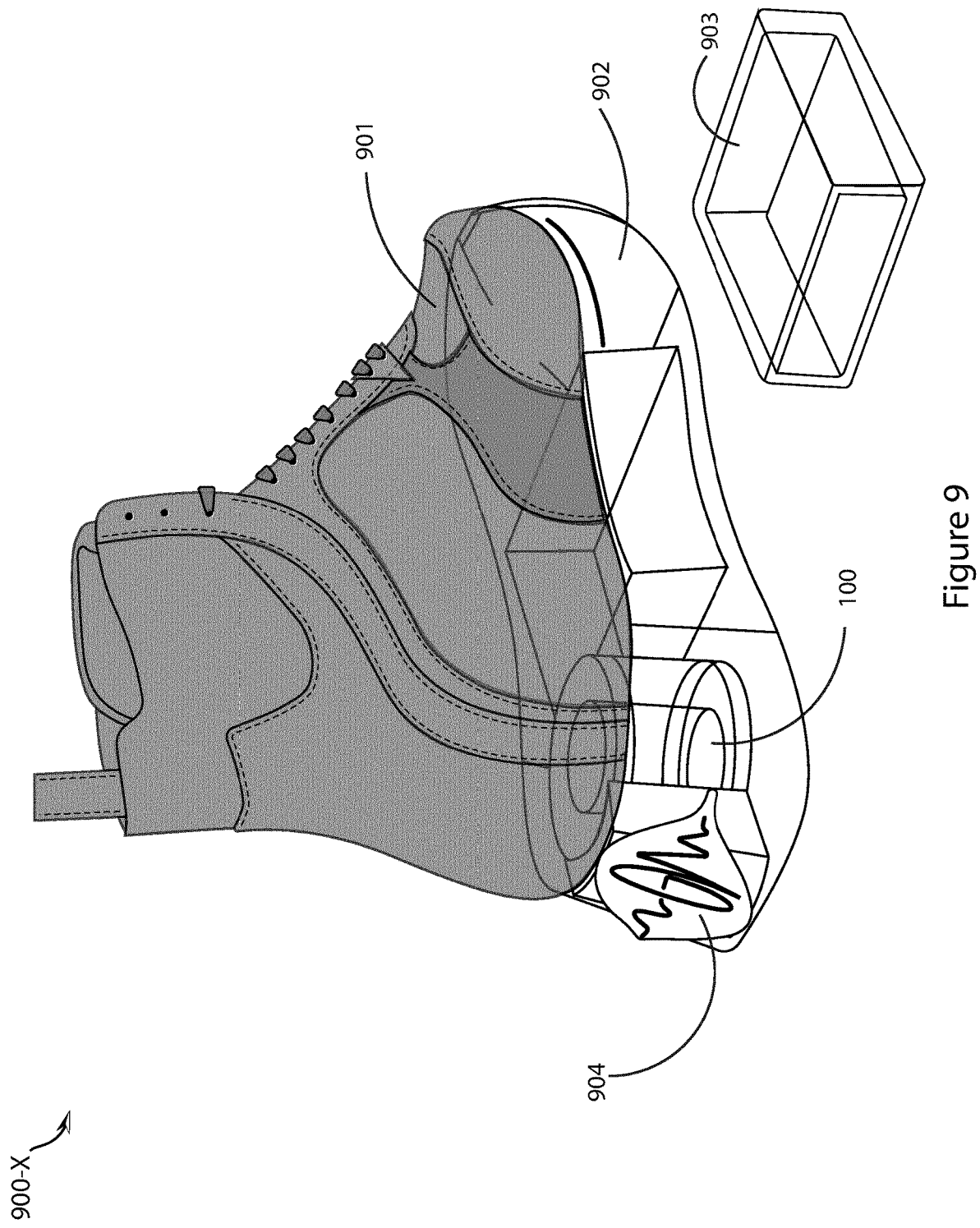
FIG. 9 illustrates an example configuration of an item of footwear adapted to receive a transducer as described herein.

FIG. 9 illustrates a typical application of transducer apparatus 100 embedded into, in this instance, an item of footwear 900-X. The illustrated item of footwear may be one half of a pair (900-X, 900-Y) of similarly configured items of footwear, with each item including a respective transducer and being configured generally as described below. The item of footwear 900-X comprises an upper piece element 901 and a sole wherein the transducer element 100 (or 700) may be embedded in the heel portion of the sole. The heel and the ball of the foot are the highest pressure points of the human foot and therefore will have most contact with the sole of the shoe. Thus, placing the transducer in the heel part of the sole may maximise the sensation experienced by the wearer. Additionally the heel of the foot is directly in-line with the leg and so vibration of the user's heel will be transferred up the body, as it does naturally when low frequency ground vibrations interact with a standing person. In order to maintain a relatively thin sole, the item of footwear includes a single transducer 100 placed centrally in the heel area of the footwear.

The transducer 100 generates heat predominantly through resistive losses in the solenoids. The generated heat is managed by transferring the heat via a thermally conductive path to a heatsink 904 which is placed externally to the sole. Such heatsink 904 may be shaped in such a way as to feature or be a feature of the decorative design of the shoe. The power amplifier (not visible) for the transducer 100 may be located in close proximity to the transducer and heatsink to minimise transmission distance loss and to reduce the total number of heatsink areas required by using a single heat sink for both the transducer and the amplifier.

The sole 902 also comprises of a recess into which the wireless-communication signal processing, power amplification and batteries may be located. These may be provided in a single module 903, which may be removable from the sole 902 for repair and/or charging of the batteries. The wireless-communication signal processing, power amplification and batteries 903 may be located in the arch region between the toe and heel portion of the sole.

FIG. 10 illustrates a tactile stimulation system comprising a first vibration apparatus 900-X (e.g. a first item of footwear as illustrated in FIG. 9) and a second vibration apparatus 900-Y (e.g. a second item of footwear similar to that illustrated in FIG. 9).

For conciseness, the vibration apparatuses 900-X and 900-Y will be referred to as first and second shoes. However, it will be understood that they are not limited to such.

The first shoe 900-X of the pair comprises a first transducer 100-X (or 700) configured to convert a first electrical signal into vibrational movement. The first shoe 900-X also comprises a first wireless receiver 1103 configured to wirelessly receive a first data signal transmitted via a first communications protocol. The first wireless receiver 1103 may be a Bluetooth (e.g. Bluetooth 4.2) audio (e.g. stereo audio) receiver element 1103.

The first shoe may further comprise a first wireless transmitter configured to wirelessly transmit a second audio signal via a second, different communications protocol. For instance, the second communications protocol may be an RF UHF protocol. The use of this different protocol (other than Bluetooth) may serve minimise any delay between is the frequency response of the first transducer 100-Y at the second shoe 900-Y as compared to that of the transducer 100-X at the first shoe 900-X.

The first shoe 900-X may further comprise processing apparatus 1109-X configured to cause generation, and provision to the first transducer 100-X, of a first electric signal (for causing vibration in the transducer) based on the wirelessly received first audio signal. In addition the processing apparatus 1109-X is configured to cause provision for transmission by the first wireless transmitter 1108, of a second audio signal derived from the wirelessly received first audio signal. The first wireless transmitter 1108 may transmit the second audio signal via a different communications protocol to that via which the first audio signal was received.

More specifically, the (first) audio signal received by the receiver 1103 is passed to a first filter 1106-X. In some examples, the audio signal may be passed to the filter 1106-X via mixer. In examples, in which the signal is a stereo audio signal, just one of the two channels of the stereo signal may be passed to the first filter 1106-X.

The first filter may be a controllable band-pass filter 1106-X where one or more of the bandwidth, and upper and lower cut-off may be modified. The signal from the first filter 1106-X may then pass to a power amplifier 904-X and thereon to transducer 100-X for causing vibration to occur.

The other channel of the received stereo audio signal may pass to a second filter 1107-X. The second filter 1107-X may be a controllable band-pass filter where one or more of the bandwidth, and upper and lower cut-off may be modified.

The signal output by the second filter 1107-X may then pass to and be transmitted by the first wireless transmitter 1108. As mentioned above, the first wireless transmitter 1108 may transmit its signal using a different protocol to that by which the first audio signal is received.

In examples in which the received signal is not stereo, the output of the first filter 1106-X may also be passed to the transmitter.

In some examples the first shoe may include a digital audio player 1105. In such examples, the signal output by the first receiver 1103 may pass to the audio mixer 1104-X, which also receives, at another channel, audio from the on-board digital audio player element 1105. The audio mixer enables the selective provision to the first transducer 100-X (and the second shoe) of an audio signal received by the receiver or an audio signal output by the on-board digital audio player. In some examples, the on-board digital audio player may play audio upon powering on of the apparatus 900-X/Y or may be used to play a calibration audio track for performance feedback measurements.

The signal from the audio mixer 1104-X may be passed to the first filter similarly to as described above.

Power for the shoe 900-X may be delivered from on-board batteries 1113-X. The system power may be managed by module 1112-X and system power may be managed by element 1110-X.

On-board batteries 1113-X may also include inductive wireless charging whereby an external oscillating electromagnetic field from a charging pad (not shown) excites the inductive coil 1115-X such that power can be transferred wirelessly between the charging pad and the inductive coil 1115-X. The power from the inductive coil 1115-X passes through a charge management device 1114-X, 1114-Y.

The various functions of the first shoe 900-X may be controlled or monitored by the processing apparatus 1109-X, which may be a microprocessor. In addition, the first shoe may include a user input device 1111-X (e.g. buttons) to enable the user to provide commands directly to the shoe.

The second shoe 900-Y comprises a second transducer 100-Y (e.g. any of the transducers described above) which is configured to convert a second electrical signal into vibrational movement.

The second shoe further comprises a second wireless receiver 1116 configured to wirelessly receive the audio signal transmitted by the first wireless transmitter 1108 of the first shoe via the second communications protocol (e.g. RF UHF).

The second shoe may further comprise second processing apparatus 1109-Y configured 1109-Y to cause generation, and provision to the second transducer, of the second electric signal based on the audio signal received by the wirelessly received second wireless receiver 1116.

The operation of the audio processing functions of the second shoe 900-Y may be similar to that described with reference to the first shoe 900-X. Specifically, the signal output by the second wireless receiver 1116 may be provided to a third filter 1106-Y, which may be controllable band pass filter such as described with reference to the first shoe 900-X. The output of the third filter 1106-Y may be provided to a second power amplifier 904-Y. The output of the second power amplifier is then provided to the second transducer 100-Y.

The second shoe may also have on-board batteries as well as the battery-related functionality described with reference to the first shoe 900-X.

Similarly to the first shoe, all functions of the second shoe 900-Y may be controlled or monitored by processing apparatus 1109-Y, which may be a microprocessor. In addition, the second shoe 900-Y may include a user input device 1111-Y (e.g., buttons) to enable the user to provide commands directly to the shoe.

Until the common release of Bluetooth 5.0 which will enable two devices (i.e. shoes and the user's headphones 1102) to be simultaneously connected to a user's mobile device 1000, the system may require a dual-Bluetooth transmitter as described by element 1101 to enable audio to be transmitted to the user's headphones 1102 and the first shoe 900-X. The use of such a dual transmitter ensures that the signal latency between the user's audio device 1100 and the Bluetooth headphones and shoes is similar.

An alternative solution is to include another Bluetooth transmitter in one of the shoes that transmits to the headphones. However the signal from the Bluetooth receiver on the shoe that is to be delivered to the processing and thereafter transducer, would need an artificial delay added to the signal in order to match that of the delay from the shoe through Bluetooth to the users headphones. For practicality having a dual Bluetooth transmitter externally to the footwear allows for more options of audio device that may be connected with both the user's headphones and shoes simultaneously.

The processing apparatus 1109X, 1109-Y may comprise at least one processor (also referred to as processing apparatus) communicatively coupled with memory (not shown). The memory may have computer readable instructions stored thereon, which when executed by the processor cause performance of various ones of the operations described with reference to the above figures.

The at least one processor may be of any suitable composition and may include one or more processors of any suitable type or suitable combination of types. For example, the at least one processor may be a programmable processor that interprets computer program instructions and processes data. The at least one processor may include plural programmable processors. Alternatively, the at least one processor may be, for example, programmable hardware with embedded firmware. The at least one processor, which may be termed "processing means", may alternatively or additionally include one or more Application Specific Integrated Circuits (ASICs). In some instances, processing apparatus may be referred to as computing apparatus.

The at least one processor is coupled to the memory (which may be referred to as one or more storage devices) and is operable to read/write data to/from the memory. The memory may comprise a single memory unit or a plurality of memory units, upon which the computer readable instructions (or code), is stored. For example, the memory may comprise both volatile memory and non-volatile memory. For example, the computer readable instructions/program code may be stored in the non-volatile memory and may be executed by the at least one processor using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing apparatus" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A transducer configured to convert electrical signals into vibrational movement, the transducer comprising:
   an axially-magnetised reciprocating magnet magnetically suspended between first and second axially-magnetised stationary magnets located on opposing sides of the axially-magnetised reciprocating magnet, wherein the axially-magnetised reciprocating magnet comprises an aperture such that the reciprocating magnet has an inner boundary and an outer boundary; and
   at least two pairs of concentrically positioned electromagnetic solenoids, the at least two pairs of concentrically positioned electromagnetic solenoids being configured to drive the reciprocating magnet to reciprocate in a volume between the first and second axially-magnetised stationary magnets,
   wherein a first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

2. The transducer of claim 1, wherein, when viewed along the axis of reciprocation of the axially-magnetised reciprocating magnet, the first solenoid of each of the pairs of concentrically positioned electromagnetic solenoids is located within the aperture of the reciprocating magnet, and the second solenoid of each of the pairs of concentrically positioned electromagnetic solenoids is located outside the outer boundary of the reciprocating magnet.

3. The transducer of claim 1, comprising a central guide member, wherein the volume in which the reciprocating ring magnet is driven to reciprocate surrounds the central guide member and the central guide member extends through the aperture of the reciprocating magnet, the at least two pairs of concentrically positioned electromagnetic solenoids being configured to drive the reciprocating magnet to reciprocate along a length of the central guide member.

4. The transducer of claim 3, comprising an outer guide member surrounding and defining an outer boundary of the volume in which the reciprocating magnet is driven to reciprocate.

5. The transducer of claim 4, wherein an outer surface of the central guide member that is adjacent the inner boundary of the reciprocating magnet and an inner surface of the outer guide member that is adjacent the outer boundary of the reciprocating magnet are formed of a material which reduces friction between the reciprocating magnet and the central and outer guide members.

6. The transducer of claim 4, wherein the second solenoid of each of the pairs of concentrically positioned electromagnetic solenoids is located within, or forms part of, the outer guide member.

7. The transducer of claim 3, wherein the first solenoid of each of the pairs of concentrically positioned electromagnetic solenoids is located within, or forms part of, the central guide member.

8. The transducer of claim 3, wherein:
the central guide member includes a central guide member fluid channel extending through a central region of the central guide member to allow fluid to pass through the central region of the central guide member between a first end of the central guide member and a second end of the central guide member;
the transducer includes at least one second fluid channel configured to allow fluid to pass between the volume in which the axially-magnetised reciprocating magnet is driven to reciprocate and the first end of the central guide member fluid channel; and
the transducer includes at least one third fluid channel configured to allow fluid to flow between the volume in which the axially-magnetised reciprocating magnet is driven to reciprocate and a second end of the central guide member fluid channel.

9. The transducer of claim 8, wherein the transducer is hermetically sealed.

10. The transducer of claim 1, comprising a shock absorbing material provided between the axially-magnetised stationary magnets and the reciprocating magnet.

11. The transducer of claim 10, wherein the shock absorbing material is provided on a surface of the axially-magnetised stationary magnets that faces the reciprocating magnet.

12. The transducer of claim 10, wherein the shock absorbing material is provided on surfaces of the reciprocating magnet that face the axially-magnetised stationary magnets.

13. The transducer of claim 1, comprising magnetic shielding to magnetically shield the environment around the transducer from the magnets of the transducer.

14. The transducer of claim 1, wherein the reciprocating magnet comprises:
a first main surface which faces the first axially-magnetised stationary magnet;
a second main surface which faces the second axially-magnetised stationary magnet;
an inner surface extending between the first and second main faces at the inner boundary of the reciprocating magnet; and
an outer surface extending between the first and second main faces at the outer boundary of the reciprocating magnet,
and wherein:
an edge of the first solenoid of a first of the pairs of concentrically positioned electromagnetic solenoids is positioned adjacent an edge of the reciprocating magnet that connects the first main surface and the inner surface;
an edge of the first solenoid of a second of the pairs of concentrically positioned electromagnetic solenoids is positioned adjacent an edge of the reciprocating magnet that connects the second main surface and the inner surface;
an edge of the second solenoid of a first of the pairs of concentrically positioned electromagnetic solenoids is positioned adjacent an edge of the reciprocating magnet that connects the first main surface and the outer surface; and
an edge of the second solenoid of a second of the pairs of concentrically positioned electromagnetic solenoids is positioned adjacent an edge of the reciprocating magnet that connects the second main surface and the outer surface.

15. An item of footwear comprising the transducer of claim 1.

16. The item of footwear of claim 15 comprising an amplifier positioned adjacent to the transducer and configured to provide the electrical signals to the transducer.

17. The item of footwear of claim 15 comprising a removable module which includes a battery pack and a transceiver for receiving wireless signals based on which the electric signals provided to the transducer are generated.

18. A tactile stimulation system comprising:
a first vibration apparatus and a second vibration apparatus,
wherein the first vibration apparatus comprises:
a first transducer configured to convert a first electrical signal into vibrational movement;
a first wireless receiver configured to wirelessly receive a first data signal transmitted via a first communications protocol;
a first wireless transmitter configured to wirelessly transmit a second data signal via a second, different communications protocol; and
first processing apparatus configured to:
generate, and provide to the first transducer, the first electric signal based on the wirelessly received first data signal, and
generate, and provide for transmission by the first wireless transmitter, a second data signal based on the wirelessly received first data signal; and
wherein the second vibration apparatus comprises:
a second transducer configured to convert a second electrical signal into vibrational movement;
a second wireless receiver configured to wirelessly receive the second data signal transmitted by the first wireless transmitter of the first vibration apparatus via the second communications protocol; and second processing apparatus configured to:
generate, and provide to the second transducer, the second electric signal based on the wirelessly received second data signal,
wherein the first electric signal and the second electric signal cause the first and second transducers to vibrate with substantially the same frequency response.

19. The tactile stimulation system of claim 18, comprising an audio player or an accessory for an audio player, wherein the audio player or the accessory for the audio player comprises:
a second wireless transmitter configured to wirelessly transmit the first data signal to the first wireless receiver at the a first vibration apparatus via the first communications protocol, the first data signal being generated based on an audio data signal output by the audio player; and
a third wireless transmitter configured to wirelessly transmit the second data signal to an audio speaker.

20. The tactile stimulation apparatus of claim 19, wherein the third wireless transmitter is configured to wirelessly transmit the first data signal to the audio speaker via the first communications protocol.

21. The tactile stimulation apparatus of claim 18, wherein the first communications protocol is a Bluetooth protocol and/or the second communications protocol is a RF UHF communications protocol.

22. The tactile stimulation system of claim 18, wherein each of the first and second transducers comprises:
an axially-magnetised reciprocating magnet magnetically suspended between first and second axially-magnetised stationary magnets located on opposing sides of the axially-magnetised reciprocating magnet, wherein the axially-magnetised reciprocating magnet comprises an aperture such that the reciprocating magnet has an inner boundary and an outer boundary; and
at least two pairs of concentrically positioned electromagnetic solenoids, the at least two pairs of concentrically positioned electromagnetic solenoids being configured to drive the reciprocating magnet to reciprocate in a volume between the first and second axially-magnetised stationary magnets,
wherein a first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

23. The tactile stimulation system of claim 18, wherein the first vibration apparatus is provided in a first item of footwear of a pair of items of footwear and the second vibration apparatus is provided in a second item of footwear of the pair of items of footwear.

* * * * *